Dec. 25, 1956    H. R. LAHR    2,775,404
NAVIGATIONAL COMPUTERS
Filed Aug. 12, 1954    2 Sheets-Sheet 1

*INVENTOR.*
HAROLD R. LAHR
BY
Thiess Olson, Mecklenburger,
von Holst, & Coltman.

Dec. 25, 1956 H. R. LAHR 2,775,404
NAVIGATIONAL COMPUTERS
Filed Aug. 12, 1954 2 Sheets-Sheet 2

*INVENTOR.*
HAROLD R. LAHR

United States Patent Office 2,775,404
Patented Dec. 25, 1956

2,775,404

NAVIGATIONAL COMPUTERS

Harold R. Lahr, Chicago, Ill., assignor to United Air Lines, Inc., Chicago, Ill., a corporation of Delaware Application August 12, 1954, Serial No. 449,476

16 Claims. (Cl. 235—61)

This invention relates to navigational computers or calculators of the circular-disc slide rule type, and more particularly to an improved computer especially adapted for solving certain aeronautical and navigational problems. Specifically, in one embodiment the calculator is designed for computing the velocity and direction of the wind while in flight, based on certain given navigational data, and for computing the magnetic heading and ground speed for planning the flight when the velocity and direction of the wind is forecast or known. The computer also may be used to solve other related problems.

It is well known that in air navigation a basic problem is the solution of a vector triangle of which one vector component is the wind, each side of the triangle representing a speed and a direction. Speed is usually measured in statute miles per hour or in knots. Direction is measured in degrees clockwise from true north.

The six elements in the vector triangle are:

(1) True course. This is the direction the aircraft actually moves across the earth. True course can be determined from a chart by measuring the angle clockwise from true north to the direction of travel.

(2) Ground speed. This is the effective speed of the aircraft relative to the ground.

(3) Wind direction. This is the direction from which the wind is blowing.

(4) Wind speed. This is the speed or velocity of the wind at the particular altitude at which the aircraft is flying.

(5) True air speed. This is the actual speed of the aircraft through the air. As the air surrounding an aircraft is generally in motion relative to the ground below, the true air speed will differ from the ground speed in accordance with this relative motion.

(6) True heading. This is the direction in which the aircraft is pointed. If the air surrounding the aircraft is in motion (i. e., if there is a wind) the true heading may differ substantially from the true course.

Another factor which is used in computing navigational problems, is the crab angle. This is not an independent element but is computed from the true course and the true heading and actually is the difference between the direction of these two elements.

While it is readily apparent that the vector triangle may be solved formally by conventional trigonometry, it should be obvious that this form of solution is too slow and difficult to be practical under most flight conditions. Heretofore several types of graphic computers have been devised to speed up the solution to these navigational problems while maintaining reasonable accuracy.

As will be subsequently shown, the vector triangle, which is basic to air navigation problems, is unique in that the ground speed and air speed are generally of large magnitude compared to the wind velocity and consequently the sides of the triangle representing the ground speed and true air speed are normally considerably longer than the side representing the wind speed. This results in a long, narrow triangle with the apex at one end. Hence, in order to show the wind as a vector which is large enough to be readable with reasonable accuracy, computers heretofore have been inconveniently large and bulky.

It is therefore an important object of this invention to provide a compact pocket-size computer capable of solving air navigational problems of the type indicated hereinabove with reasonable accuracy. An object relating thereto is to provide a computer in which there is provided a graphic portion which shows only the wind and the wind components whereby the wind may be shown on a sufficiently large scale for accurate computation.

A further object is to afford an air navigational computer in which the major portion of the vector triangle is eliminated from graphic representation by mathematically resolving the true air speed into components.

Yet another object is to provide a computer with a scale by means of which distances may be scaled off of any map and converted to mileages which may be read directly, regardless of the scale to which the map is drawn.

It is well known in air navigation that computations for speed, distance, and time must also often be made. Although it is true that many of these factors are measured by instruments, nevertheless corrections and computations must be made for various factors which might affect the readings of the instruments. For example, such factors as air density, air compressibility, and compressibility-heating affect the measurement of air speeds and altitude.

Various computations have been made and tabulated which adequately serve the function of determining these factors. However, such tabulations, if in independent form, are not readily adapted for use in a rapidly moving aircraft in conjunction with a computer of the type which is contemplated by this invention.

It is therefore another important object of the invention to provide a computer, on one side of which may be provided correlated scales used in computing and solving such problems as time-speed-distance, fuel consumption, air speed corrections, and altitude corrections, and on the other side of which may be provided the various unique scales and arrangement of scales for solving the wind problems described herein, said two sides functioning to solve all of the problems normally confronting an air navigator.

An object relating thereto is to so construct the computer that transparent windows and members are provided through which may be read scales imprinted on the back of other members of the computer. In this manner, one member may serve to compactly accommodate thereon a plurality of scales and function in many capacities.

Thus, the wind side of the computer comprises a pair of relatively movable members and a stationary member. The stationary member is provided with a combined log sine and log cosine scale which is used to set or read crab angles. This scale is printed on the marginal edge of the circular member. Beneath this scale is provided a transparent window through which may be read a circular log scale imprinted on the back of the movable member, the front of which is used as the time-speed-distance calculator side. This scale is used to set or read the true air speed and to read or set the true air speed components. The stationary member is further provided with a rectangular grid which is used to set or read the wind components, and an overlying circular grid to read or set the total wind. The stationary member is also provided with a scale which may be used to correct the variation between magnetic course and true course.

The second movable member comprises a transparent circular grid and protractor which is mounted over the stationary rectangular grid. This is used to read or set wind direction and velocity and to convert readings from absolute directions with respect to north to readings relative to the aircraft axis or course. It is thus readily apparent that the wind problems of air navigation may be accurately and readily solved on a simple pocket size slide-rule type computer with a high degree of accuracy.

Yet a further object is to provide a computer of the type indicated hereinabove which has means for maintaining the various members in accurate relationship one to the other without materially affecting the ready manipulation of the movable members.

Still another object is to afford a computer of the character described which is of simple, inexpensive construction, yet sturdy, accurate and compact.

The foregoing objects and other objects which will appear as the description proceeds are accomplished by this invention which consists of certain novel features of construction, arrangement and a combination of parts hereinafter fully described, illustrated in the accompanying drawings, and particularly pointed out in the appended claims; it being understood that various changes in the form, proportion, size and minor details of the structure may be made without departing from the spirit or sacrificing any of the advantages of the invention.

For the purpose of facilitating an understanding of the invention, the accompanying drawings illustrate a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
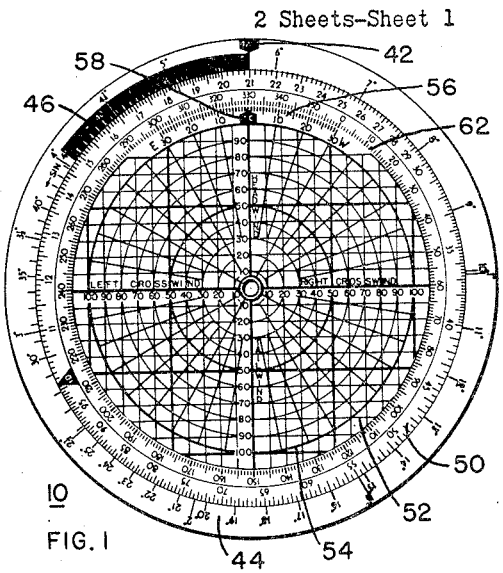
Fig. 1 is a plan view of the side of the computer which is used in solving air navigational wind problems.
Figure 2:
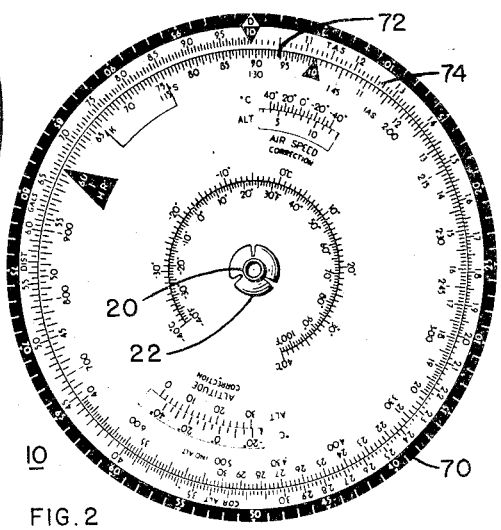
Fig. 2 is a plan view of the other side of the computer which is used in solving time-speed-distance problems.
Figure 3:
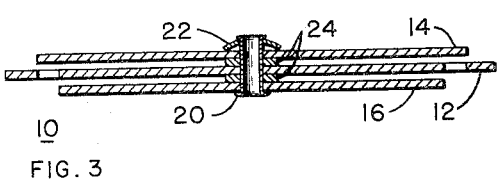
Fig. 3 is a cross-sectional view of the computer.

Referring now to the drawings, and more particularly to Figs. 1, 2 and 3, the computer indicated generally by reference numeral 10 comprises a plurality of circular discs including a central fixed disc member 12 of larger diameter than an outer rotatable member 14 positioned on one side of member 12. A third rotatable member 16 of smaller diameter than the outer disc 14 is positioned on the opposite side of the central disc 12.

Each of these discs are in turn provided with a central annular aperture such as aperture 18 which enables them to be aligned and mounted on a grommet 20 having a spring washer 22 mounted thereon. Thus it will be perceived that the grommet 20 and spring member 22 cooperate to force the discs together so that the proper frictional relationship is maintained between the discs. This is accomplished without, however, interfering with the rotatability of the computer members during operation. It should also be noted that spacer discs such as discs 24 positioned between the various members 12, 14, and 16 likewise assist in maintaining the necessary frictional relationship between the discs while simultaneously permitting ready manipulation of the computer by the operator. It should be apparent that the computer can function satisfactorily without the spacer discs 24 or with other types of fasteners such as a bolt and nut assembly.

The time-speed-distance side of the computer shown in Fig. 2 of the drawings conveys more or less conventional information and therefore will not be described in detail in this application. Suffice it to say that it is provided with the necessary log scales, temperature, air pressure, speed, altitude, and fuel scales and indicia which enable its use for solving the problems and making the corrections of speed-time-distance computations as indicated hereinabove for use in performing vector problems on the wind side of the instrument.

Figure 5:
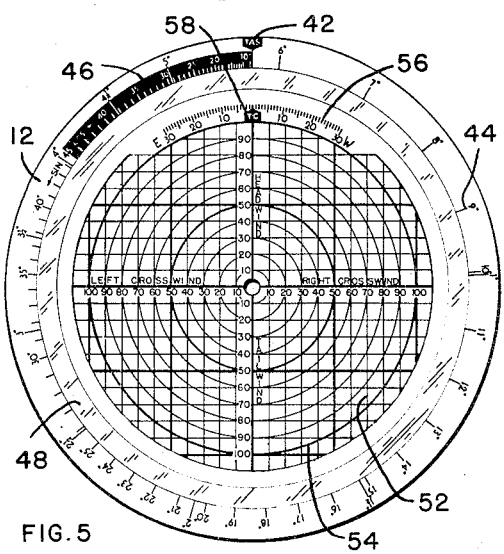
Fig. 5 is a plan view of the base or body disc of the computer of Fig. 1 showing the wind problem side thereof.

Attention is therefore directed to the various other figures of the drawings, especially Fig. 1, in which the wind side of the calculator 10 is illustrated without data applied thereto. However before considering the detailed description of the construction of the members of the computer and the scales which are imprinted thereon, attention is first directed to Figs. 7 and 8 of the drawings which graphically represent typical vector diagrams in which are embodied typical air navigational problems to be solved by the use of the computer. In Fig. 5 of the drawings the usual elements are graphically depicted. Although there are several possible combinations of known and computed elements, in air navigation there are but two combinations which are most often encountered. For example:

When planning the flight the navigator or pilot normally knows:

(1) The true course (represented by the symbol TC)
(2) The true air speed (represented by the symbol TAS)
(3) The forecast wind direction
(4) The forecast wind speed and he wishes to find:

(5) The true heading and crab angle (represented by the symbols TH and CA respectively)
(6) The ground speed (represented by the symbol GS)

While in flight he normally knows:

(1) The true course (TC)
(2) The true air speed (TAS)
(3) The true heading and crab angle (TH and CA)
(4) The ground speed (GS)

and he wishes to find:

(5) The actual wind direction
(6) The actual wind speed

Figure 8:
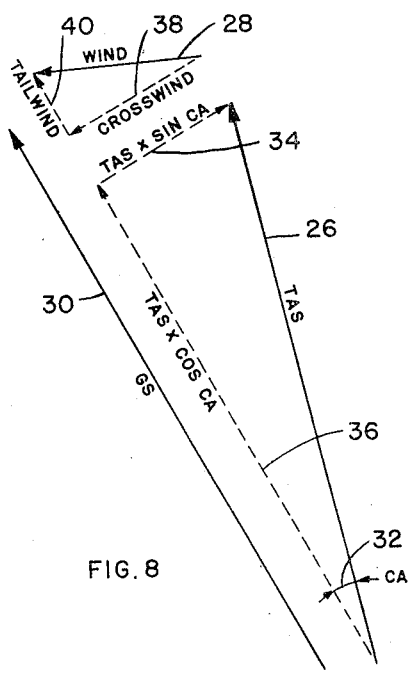
Fig. 8 is an exploded view of the same diagram showing the true air speed and the wind resolved into various components.
Figure 7:
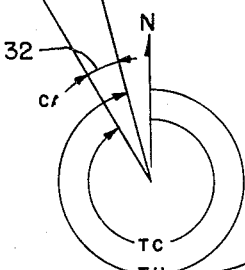
Fig. 7 is a graphic representation of a typical air navigation vector triangle.

Referring to the vector diagram, Fig. 7, it will be noted that the true air speed vector 26 and the wind speed vector 28 add together vectorially to define the ground speed vector 30. The air speed vector 26 and the ground speed vector diverge by an angle 32 which represents the crab angle. In computers heretofore known, this entire vector problem is plotted, requiring a large device to reproduce the entire problem on a scale which will provide the desired accuracy. However by manipulating certain trigonometric processes and utilizing normal components of wind, a system is hereby provided which produces increased accuracy on a relatively small device. As illustrated in Fig. 8, the true air speed vector 26 is divided into two normal components 34 and 36, one coincident with the true course and being a portion of the ground speed 30, and the other being normal to the true course, i. e., transverse to the line of flight of the aircraft, and equal in magnitude to the cross wind component 38 of wind speed 28 and of opposite direction or sign.

The product of the true air speed 26 multiplied by the sine of the crab angle 32 is the sine component 34 of true air speed which is equal and opposite to the crosswind:

$$TAS \times \text{sine } CA = \text{sine component } TAS$$

The product of true air speed 26 multiplied by the cosine of the crab angle 32 is a cosine component 36 of true air speed which is also an arithmetic component of ground speed:

$$TAS \times \text{cosine } CA = \text{cosine component } TAS$$

The arithmetic difference between the cosine component 36 of the true air speed vector 26 and the ground speed vector 30 gives us the tailwind or headwind 40:

$$GS - TAS \times \cos CA = \text{wind (tailwind or headwind)}$$

To enable these trigonometric computations to be readily performed on a computer of the slide rule type, the computer of this invention is provided with the unique disposition of scales as will be described in detail.

Referring to Fig. 5 of the drawings, the central basic disc 12 has imprinted along its outer marginal edge, a combined log sine and log cosine scale. While it will be understood that a logarithmic scale never reaches the zero value, for the purpose of this computer, the index 42 which is labeled TAS will be considered as the origin or starting point of all scales. A log sine scale 44 is printed on the periphery of disc 12 in a clockwise manner. The angle represented at the index 42 is slightly less than .6° and increases logarithmically in the clockwise direction so that the angle represented at the quadrature position is about 1°, and at the full revolution position, again indicated by the index 42, the angle indicated is approximately 6°. The angular indications are spaced more closely as the values increase so that at the end of the fifth quadrant a 10° angle is indicated, at the end of the sixth quadrant an 18° angle is indicated, and at the end of the seventh quadrant at 35° angle is indicated. As will be understood, these indicia are employed only with respect to crab angle, that is the angle between the true heading and true course of the craft, and this will generally be a small angle, rarely exceeding 15 or 20°. The sine scale terminates at a 45° indication and a cosine scale 46 extends therefrom, the angular indications decreasing logarithmically in a clockwise direction whereby the TAS index 42 corresponds to 0° on the cosine scale 46.

Figure 6:
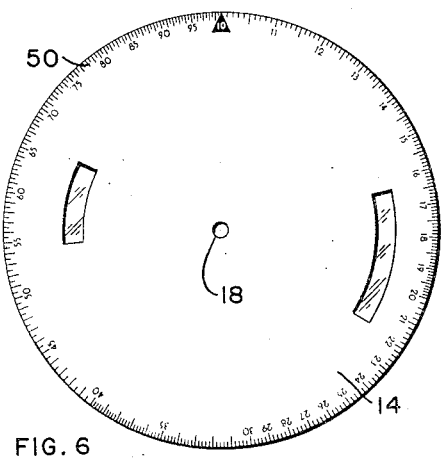
Fig. 6 is a plan view of the wind problem side of the opaque rotatable disc which forms a part of the embodiment of Fig. 1.

Just below the combined sine and cosine scales 44 and 46, the disc 12 is provided with a transparent circular window 48 which is concentric with the scales 44 and 46. This window enables the reading of a logarithm scale 50 which is imprinted on the outer marginal edge of the inner face of the outer disc 14 as illustrated in Fig. 6 and is used to set the TAS and to read or set the TAS components. Thus the scale 50 is movable as the disc 14 is rotated, and the scale may be read through the transparent window 48 of disc 12. The disc 12 is further provided with a rectangular grid 52 which is encircled by the transparent window 48. The vertical ordinates of the grid bear the indicia "Headwind" and "Tailwind" and the horizontal ordinates bear the indicia "Left crosswind" and "Right crosswind." This grid is fixed and is used to set or read the wind components in cooperation with other parts to be described. Imprinted over the rectangular grid may be a circular grid 54, the purpose of which will become apparent as the description proceeds.

Along one peripheral sector of the grid 54 there is provided a scale 56 which is graduated in degrees from 0 to 30 degrees in two directions, east and west, from a true course index 58. This scale is used to correct the variation between the magnetic course and the true course.

Figure 4:
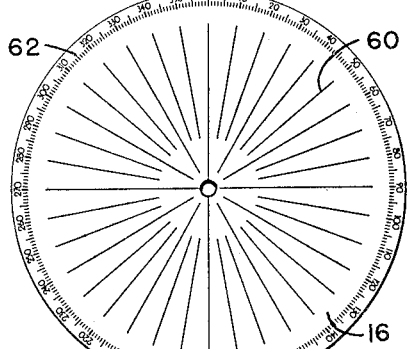
Fig. 4 is a plan view of the transparent outer disc of the computer forming the outermost portion of the wind problem side of the computer.

The third disc 16 is made of a transparent material and has formed thereon a compass rose 60 having 10° radials. A 360° compass scale or rose 62 is also reproduced on the outer marginal edge of disc 16 as shown in Fig. 4 of the drawings. This disc 16 is used to read or set the wind direction and velocity. The circular grid 54 cooperates with the rectangular grid 52 in solving the vector diagram problem. If desired the circular grid 54 may be formed separately on the disc 16 rather than on the central disc 12, or if desired the circular grid and radial lines may be left off. Though the wind speed and direction are normally read or set with reference to circular grid and radial lines, if the wind were represented by a pencil dot, the wind speed and direction could be read or set by rotating disc 16 until the dot was over one of the vertical or horizontal ordinates which pass through the center of the computer. The disc 16 may be made of a flat matte-finish material upon which pencil markings may be made for facilitating the readings.

In solving the navigational problems, the sine and cosine scales 44 and 46 and the logarithm scale 50 cooperate for the performance of computations and solutions of wind vector problems. Thus, the air speed and the wind may be resolved into components by performing the necessary trigonometric computations through the relative positioning of the discs of the computer. As the scales of the computer are all logarithmic, placing the scales in such relative positions that the scale lengths are additive will produce readings which are products of the numbers indicated on the component scale lengths. This is similar to the operation of the logarithmic slide rule and should be readily understood.

As the description proceeds it will be noted that after only two settings on the computer, all of the resultant information is read directly without necessitating further operation of the computer. In this connection it should be noted that the graphical portion of the computer, namely the circular grid 54 and the rectangular grid 52, are designed so that the mathematical relationship between these members and the cooperating log and log sine-cosine scales are such as to permit direct reading after the initial setting.

Figure 9:
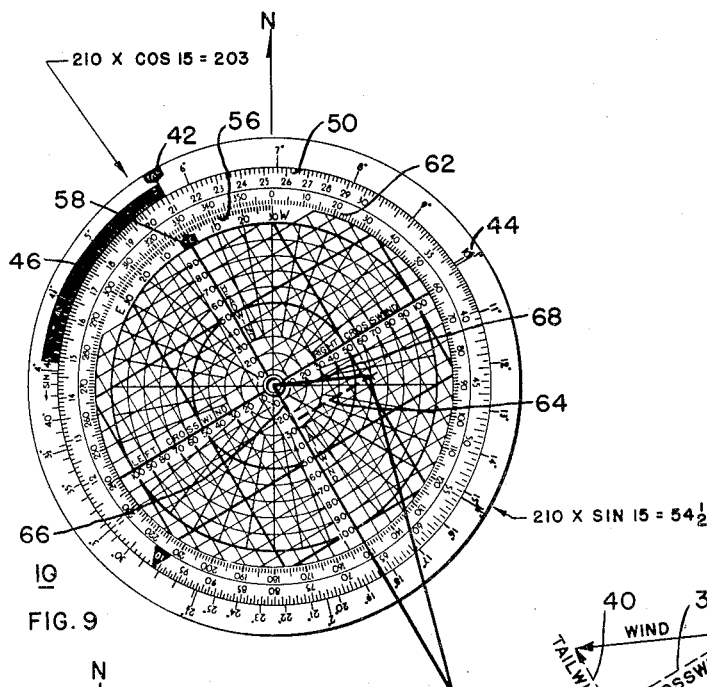
Fig. 9 is a graphic representation of a typical vector diagram illustrating its relationship to the computer and the manner in which a typical wind problem is solved by the computer.

To better understand the operation of the computer, the actual solution of an air navigational problem will now be described in some detail. For this purpose attention is directed to Figs. 7, 8 and 9 of the drawings in which the solution of such a problem is graphically portrayed. Let us assume that it is desired to find the wind direction and wind speed of an aircraft while in flight. The known elements are:

True course, TC _____ 330°.
True air speed, TAS _____ 210 knots.
Crab angle, CA _____ 15° right.
Ground speed, GS _____ 228 knots.

First, the logarithm of the true air speed (TAS), namely 210 knots, on scale 50 is set under the TAS index 42. Then the true course (TC), namely 330° on the compass rose 62, is set over the TC pointer 58 which appears on scale 56. With these two settings the computer is now set for reading the desired wind direction and wind speed without any further manipulation.

The tailwind component is first determined by multiplying the true air speed by the cosine of the crab angle and subtracting this from the ground speed:

Wind component $= GS - (TAS \times \cos CA)$

Thus, under 15° on the cosine scale 46 read 203 knots on the log scale 50. This is the cosine ground speed component and since it is less than the ground speed, we know that the wind is a tailwind. Thus, by subtracting the cosine ground speed component from the total ground speed, the tailwind is determined. In this case it is 25 knots.

Multiplying the true air speed by the sine of the crab angle (thus 210 knots multiplied by the sine of 15°), gives us a crosswind of 54.5 knots. Since the crab angle is to the right, we know that the wind is a right crosswind.

We have now computed the two legs of the wind component right triangle (Fig. 8) relative to the TC, namely the tailwind component and the crosswind component. The small wind component triangle may now be superimposed on the grid portion of the computer and comprises a small right triangle including crosswind component 64 and a tailwind component 66 shown in dotted outline on the graphical portion of the computer 10. Thus it will be apparent that the wind direction and speed may be read directly on the grids 52 and 54 and compass rose 62. The wind speed 68 comprises the length of the hypotenuse of the right triangle and in this case is read on the circular grid 54. It comprises the distance between the origin and the point at which a tail wind of 25 knots on the rectangular grid 52 intercepts a right cross wind of 54.5 knots. This, of course, reads as a 60 knot wind. The direction is read on the compass rose 62 and in this case is 85°. Thus the wind is 60 knots from 85°.

Conversely, when it is desired to find the true heading, crab angle, and ground speed while planning the flight, the operation of the computer is as follows, assuming the following given elements:

True course, TC _____ 330°.
True air speed, TAS _____ 210 knots.
Wind direction _____ 85°.
Wind speed _____ 60 knots.

The true air speed, 210 knots, is found on scale 50 and set under the TAS index 42. Next the true course, namely 330° on the compass rose 62, is set over the TC index 58. Under 60 knots on the circular grid 54 from a direction of 85° the right crosswind and tailwind components are indicated. From Fig. 9 it will be apparent that the components are a 54.5 knots crosswind and a 25 knots tailwind. Over the right crosswind component of 54.5 knots on the log scale 50, as viewed through the window 32, we read on the sine scale 44, the crab angle of 15° right. This is a right crab angle because the crosswind is from the right. Therefore, the true heading is 345° (330° TC plus the 15° CA). Next under 15° on the cosine scale 46, we read the cosine component of 203 knots, this being the result of the multiplication of the true air speed 210 by the cosine of 15°. The ground speed of 228 knots may be computed by merely adding the tailwind to the cosine component. (Thus, 203 plus 25 equals 228.)

It will thus be readily perceived that I have provided a unique calculator especially adapted for computing the wind by resolving the true air speed and the wind into certain components so that the components may be set up on a graphical grid as the legs of a right triangle. This then permits the reading of the resultant in the form of the hypotenuse of the right triangle. By reading the hypotenuse, both the speed and direction of the wind may be determined.

As was mentioned previously, the calculator side 16 of the computer 10 is utilized to provide necessary data for the computer operation just described. One important feature of this side of the device is believed especially useful. In this feature the outer edge of the disc 12 is provided with a scale 70 divided into one hundred equal spaces. Based on the diameter of the computer, the spacing scale is such that each of the spaces is equal to one-eighth of an inch. This outer scale 70 may then be used to scale distances from a map or chart and may be automatically calibrated to read in miles.

For example, suppose we wish to scale the distance between Chicago and Cleveland. Referring to the standard mileage scale at the border of a map (not shown) we measure an arbitrary distance. Grasping the grommet 20 lightly between the thumb and a finger, we place the zero of scale 70 on zero mileage on the standard scale and roll the edge of the computer along the distance to be measured. Suppose we find that 100 miles on the mileage scale is 31 spaces on scale 70. On the time scale 72 we place 100 opposite 31 on the distance scale 74. The computer is now set to scale any distance on the map and by reading the result from scale 72 one will automatically read the product of the distance on the map and the scale ratio. For example, to measure the distance between Chicago and Cleveland, place the zero of the computer on Cleveland and roll along the airways to Chicago. Let us suppose this measures 97 spaces along the edge scale 70 of the computer. Opposite 97 on the distance scale 74, we read the mileage of 316 on the time scale 72.

If the mileage scale of the map was simply one inch equal to 50 miles, we would place 50 on the distance scale 74 opposite eight (eight/eighths per inch) on the time scale 72. The computer is now set to scale any distance without any preliminary measurement. Thus with one scale one can scale distances off any map regardless of the scale to which it was drawn.

It is believed that this invention, the mode of construction and assembly of the described embodiment, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

What I claim and desire to secure my Letters Patent of the United States is:

1. A computer for the solution of navigation problems comprising a plurality of cooperating discs mounted on a common central axis, said discs rotatable with respect to each other, a first one of said discs having a logarithmic numerical scale thereon, and a second one of said discs having logarithmic trigonometric function scale means thereon, said scales being in side by side relationship capable of cooperating in slide rule fashion to resolve known navigational data into certain trigonometric components, one of said discs having rectilinear grid means thereon, indicia on said rectilinear grid means bearing a predetermined relationship to said trigonometric components whereby other navigational computed data is readable directly on said grid means as the measured length and direction of the hypotenuse of a right triangle whose legs correspond to said trigonometric components as set up on said grid means.

2. A computer for the solution of navigation problems comprising a plurality of cooperating discs mounted on a common central axis, said discs rotatable with respect to each other, a first one of said discs having a logarithmic numerical scale thereon, and a second one of said discs having logarithmic trigonometric function scale means thereon, said scale means comprising an index, indicia representing a cosine scale having 0° represented at said index and increasing angles represented over a small arcuate portion of the periphery of said second disc and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve known navigational data into certain trigonometric components.

3. A computer for the solution of navigation problems comprising a plurality of cooperating discs mounted on a common central axis, said discs rotatable with respect to each other, a first one of said discs having a logarithmic numerical scale thereon, and a second one of said discs having logarithmic trigonometric function scale means thereon, said scale means comprising an index, indicia representing a cosine scale having 0° represented at said index and increasing angles represented over a small arcuate portion of the periphery of said second disc and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve known navigational data into certain trigonometric components, one of said discs having rectilinear grid means thereon, indicia on said rectilinear grid means bearing a predetermined relationship to said trigonometric components whereby other navigational computed data is readable directly on said grid means as the measured length and direction of the hypotenuse of a right triangle whose legs are equivalent to said trigonometric components as determined by said scale means and set up on said grid means.

4. A computer for solving navigation problems comprising a plurality of cooperating discs mounted on a common central axle, said discs rotatable with respect to each other, a first one of said discs having a logarithmic numerical scale thereon, a second one of said discs having logarithmic trigonometric function scale means thereon, said scales being in side by side relationship capable of cooperating in slide rule fashion to resolve known navigational data into certain trigonometric components, one of said discs having rectilinear grid means thereon and one of said discs having a compass scale graduated from 0° to 360° thereon, indicia on said rectilinear grid means bearing a predetermined relationship to said trigonometric components whereby other navigational computed data is readable directly on said grid means and compass scale as the measured length and direction of the hypotenuse of a right triangle whose legs are equivalent to said trigonometric components as set up on said grid means.

5. The computer of claim 4 in which the opposite side of said discs are formed with a pair of cooperating logarithmic scales and a distance measuring scale inscribed on the outer marginal edge of the largest of said discs, said distance measuring scale adapted to cooperate with said logarithmic scales to compute actual distances based on scaled map distances, said distances combining with said navigational data to determine additional navigational information.

6. The computer of claim 4 in which said latter-mentioned disc is formed with at least one of said grid means, said grid means being of the rectangular type with vertical ordinates representing headwind and tailwind components and horizontal ordinates representing left crosswind and right crosswind components, said disc further formed with a split scale graduated in degrees corresponding to said compass scale in the east direction and in the west direction, and a true course index formed at the midpoint of said split scale.

7. A computer of the circular slide-rule type comprising a central fixed base member having a composite logarithmic sine and cosine scale formed on one side of the outer marginal edge thereof corresponding to relatively small angles, said scale being a function of the crab angle, a transparent circular window formed concentrically and inwardly of said scale, a rotatable second member mounted on one side of said base member and having a logarithmic numeric scale circumferentially formed thereon, said logarithmic scale being of a diameter sufficiently smaller than said base member to expose said numeric scale through said window, a third transparent member rotatably mounted on the opposite side of said base member, a compass scale circumferentially formed on said transparent member, and a pair of grids formed on said members, said grids and compass scale cooperating with said numeric and logarithmic sine and cosine scales to solve aeronautical navigational wind problems.

8. The computer of claim 7 in which said grids comprise a rectangular grid inscribed on said base member, and a radial grid inscribed on said transparent member.

9. The computer of claim 7 in which said members are mounted on a grommet, a spring washer mounted on said grommet and spacers likewise mounted on said grommet and positioned between said members.

10. The computer of claim 7 in which said grids comprise a rectangular grid and a circular grid imposed thereover, said grids formed on said base member within the area encircled by said window.

11. A computer for the solution of aerial navigation problems involving the resolution of wind and aircraft speed components comprising a plurality of relatively rotatable cooperating discs mounted on a common central axis, one of said discs having a logarithmic numerical scale thereon, and a second one of said discs having logarithmic trigonometric scale means thereon, said scale and scale means being in side by side relationship capable of cooperating to establish the relationship of known navigational data and the trigonometric components thereof, one of said discs having rectilinear grid means thereon, indicia on said rectilinear grid means bearing a predetermined relationship to said trigonometric components whereby the relationship thereto of other navigational computed data is directly readable on said grid means as the measured length and direction of the sides of a triangle whose legs correspond to said trigonometric components as determined by said scale and scale means.

12. A computer for the solution of aerial navigation problems involving the resolution of wind and aircraft speed components comprising a plurality of relatively rotatable cooperating discs mounted on a common central axis, one of said discs having a logarithmic numerical scale thereon, and a second one of said discs having logarithmic trigonometric scale means thereon, said scale and scale means being in side by side relationship capable of cooperating to establish the relationship of said aircraft speed and the trigonometric components thereof, one of said discs having rectilinear grid means thereon, indicia on said rectilinear grid means bearing a predetermined relationship to wind speed and said trigonometric components whereby the relationship of said wind speed and trigonometric components is readable directly on said grid means as the measured length and direction of the legs and hypotenuse of a right triangle wherein said trigonometric components correspond to said legs and said wind speed corresponds to said hypotenuse.

13. A computer for the solution of aerial navigation problems involving the resolution of wind and aircraft speed components comprising a plurality of relatively rotatable cooperating discs mounted on a common central axis, one of said discs having a logarithmic numerical scale thereon, and a second one of said discs having logarithmic trigonometric scale means thereon, said scale means comprising an index, indicia representing a cosine scale having 0° represented at said index and increasing angles represented over a small arcuate portion of the periphery of said second disc, and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve the aircraft speed into components.

14. A computer for the solution of aerial navigation problems involving the resolution of wind and aircraft speed components comprising a plurality of relatively rotatable cooperating discs mounted on a common central axis, one of said discs having a logarithmic numerical scale thereon, and a second one of said discs having logarithmic trigonometric scale means thereon, said scale means comprising an index, indicia representing a cosine scale having 0° represented at said index and increasing angles represented over a small arcuate portion of the periphery of said second disc, and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve the aircraft speed into components, rectilinear grid means, indicia on said rectilinear grid means indicating longitudinal and transverse wind speed components whereby the relationship of wind speed to said air speed components is directly readable on said grid means as the measured length and direction of sides of a right triangle whose legs correspond to said trigonometric components as determined by said scale and scale means.

15. A computer for the solution of aerial navigation problems involving the resolution of wind and aircraft speed components comprising a plurality of relatively rotatable cooperating discs mounted on a common central axis, one of said discs having a logarithmic numerical scale thereon, and a second one of said discs having logarithmic trigonometric scale means thereon, said scale means comprising an index, indicia representing a cosine scale having 0° represented at said index and increasing angles represented over a small arcuate portion of the periphery of said second disc, and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve the aircraft speed into components, said second disc having rectilinear grid means thereon, indicia on said rectilinear grid means indicating longitudinal and transverse wind speed components whereby the relationship of wind speed to said air speed components is directly readable on said grid means as the measured length and direction of sides of a right triangle whose legs correspond to said trigonometric components as determined by said scale and scale means.

16. A computer for the solution of aerial navigation problems involving the resolution of wind and aircraft speed components comprising a plurality of relatively rotatable cooperating discs mounted on a common central axis, one of said discs having a logarithmic numerical scale thereon, a second one of said discs having logarithmic trigonometric scale means thereon, said scale means comprising an index, indicia representing a cosine scale having 0° represented at said index and increasing angles represented over a small arcuate portion of the periphery of said second disc, and indicia representing a sine scale coterminus and colinear with said cosine scale and representing decreasing angles over the remaining arcuate portion of the periphery of said second disc, said numerical scale and said scale means being in side by side relationship capable of cooperating in slide rule fashion to resolve the aircraft speed into components, said second disc having rectilinear grid means thereon, indicia on said rectilinear grid means indicating longitudinal and transverse wind speed components whereby the relationship of wind speed to said air speed components is directly readable on said grid means as the measured length and direction of sides of a right triangle whose legs correspond to said trigonometric components as determined by said scale and scale means, and a third one of said discs having peripheral indicia thereon indicating angular dispositions from 0° to 360° from a predetermined radius.

References Cited in the file of this patent

UNITED STATES PATENTS

| | | |
|---|---|---|
| 922,465 | Fenn | May 25, 1909 |
| 2,506,299 | Isom | May 2, 1950 |